(12) United States Patent
Singh et al.

(10) Patent No.: US 9,266,035 B2
(45) Date of Patent: Feb. 23, 2016

(54) DISTILLATION TOWER FEED DEVICE

(71) Applicants: Vikram Singh, Fairfax, VA (US); Brian D. Albert, Fairfax, VA (US); Berne K. Stober, Esmont, VA (US)

(72) Inventors: Vikram Singh, Fairfax, VA (US); Brian D. Albert, Fairfax, VA (US); Berne K. Stober, Esmont, VA (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 135 days.

(21) Appl. No.: 13/950,870

(22) Filed: Jul. 25, 2013

(65) Prior Publication Data

US 2014/0061024 A1 Mar. 6, 2014

Related U.S. Application Data

(60) Provisional application No. 61/697,433, filed on Sep. 6, 2012.

(51) Int. Cl.
| | |
|---|---|
| *B01D 3/00* | (2006.01) |
| *B01D 3/06* | (2006.01) |
| *B01J 4/00* | (2006.01) |
| *B01F 3/04* | (2006.01) |
| *B01D 3/30* | (2006.01) |

(52) U.S. Cl.
CPC ............ *B01D 3/008* (2013.01); *B01D 3/06* (2013.01); *B01D 3/30* (2013.01); *B01F 3/04* (2013.01); *B01J 4/00* (2013.01)

(58) Field of Classification Search
None
See application file for complete search history.

(56) References Cited

U.S. PATENT DOCUMENTS

| | | | |
|---|---|---|---|
| 4,315,815 A | 2/1982 | Gearhart | |
| 4,770,747 A | 9/1988 | Muller | |
| 5,516,465 A | 5/1996 | Yeoman | |
| 5,605,654 A * | 2/1997 | Hsieh et al. | 261/79.2 |
| 5,632,933 A * | 5/1997 | Yeoman | B01D 3/32 |
| | | | 261/109 |
| 6,889,961 B2 | 5/2005 | Laird et al. | |
| 6,889,962 B2 | 5/2005 | Laird et al. | |
| 7,981,253 B2 * | 7/2011 | Sharma et al. | 202/158 |
| 8,202,403 B2 * | 6/2012 | Sideropoulos | B01D 3/008 |
| | | | 202/158 |
| 8,286,952 B2 * | 10/2012 | Lee | B01D 3/005 |
| | | | 261/109 |
| 2008/0314729 A1 * | 12/2008 | Sideropoulos et al. | 203/40 |

* cited by examiner

*Primary Examiner* — In Suk Bullock
*Assistant Examiner* — Jonathan Miller
(74) *Attorney, Agent, or Firm* — Malcolm D. Keen; Glenn T. Barrett; Andrew T. Ward (57) ABSTRACT

A feed device for a distillation tower has an annular, open-bottomed channel located around the periphery of the feed zone of the tower with an inner wall spaced from the inner curved wall of the tower and a top covering the channel to confer a generally inverted-U shape to the cross section of the channel. One or more tangential feed inlets are provided to admit a heated, mixed phase feed to the tower and direct the feed into and along the channel. One or more vapor scoops are provided for each feed inlet with the scoop(s) located on the inner wall of the channel at a sufficient distance along the channel from the inlet to permit cyclonic separation of vapor and liquid before the vapor in the feed from the inlet enters the scoop(s) and passes through a vapor exit port into the central core of the tower.

19 Claims, 7 Drawing Sheets

DISTILLATION TOWER FEED DEVICE

CROSS REFERENCE TO RELATED APPLICATION

This relates and claims priority to U.S. Provisional Patent Application No. 61/697,433, filed on Sep. 6, 2012.

FIELD OF THE INVENTION

This invention relates to devices for separating vapor and liquid. In particular, the invention relates to separating vapor and entrained liquid in a hydrocarbon distillation tower in which a mixed phase feed stream is introduced into a flash zone.

BACKGROUND OF THE INVENTION

Separation units, such as atmospheric distillation units, vacuum distillation units, and product strippers, are major processing units in a refinery. Atmospheric or vacuum distillation units separate crude oil into fractions according to boiling point so downstream processing units, such as catalytic cracking, hydrogen treating or reforming units, will have feedstocks that meet particular specifications. Crude oil separation is accomplished by fractionating the total crude oil at essentially atmospheric pressure and then feeding a bottoms stream of high boiling hydrocarbons, also known as topped crude or long resid, from the atmospheric distillation unit to a second distillation unit operating at a reduced pressure (vacuum).

The vacuum distillation unit typically separates the atmospheric unit bottoms into gas oil vapors based on boiling point, including light vacuum gas oil, heavy vacuum gas oil, lube oil distillates, and vacuum reduced crude. The non-distillable residual fraction from the vacuum tower also known as "vac resid" or "short resid", leaves the vacuum distillation unit as a heavy, viscous, liquid bottoms stream. The bottoms fraction separated from crude oil in the atmospheric distillation unit is fed to a flash zone in the lower portion of the vacuum tower. Although the heavier hydrocarbons do not vaporize, they may be carried into the lighter hydrocarbons due to entrainment in the vapors which ascend into the rectification zone above the flash zone of the tower. The entrained heavier hydrocarbons are typically contaminated with metals, such as vanadium or nickel, which can poison the downstream catalytic processing, such as hydrotreating, hydrocracking, or fluid catalytic cracking.

If the entrainment of the heavier components can be significantly reduced or eliminated, a significant improvement in the quality of the gas oil product can be realized in both yield and quantity with consequential improvements in the feed for hydroconversion units, catalytic cracking units, as well as in gas oil distillates, or lube oil distillates.

Various methods of reducing entrainment of residuum from the flash zone have been developed. Many distillation towers, especially petroleum vacuum towers, use feed inlet devices, usually known as feed horns, for introducing the feed stream to the flash zone. One type of feed horn uses a tangential entry for the vapor-liquid feed that opens into a peripheral open bottomed horn. The horn can be an annular or arcuate channel defined by an outer peripheral wall defined by the inside wall of the tower shell and an internal arcuate wall spaced from the peripheral wall of the tower with a closed top. The stream of heated feed enters the horn from the inlet and the liquid and vapor components pass along the channel between the walls while the liquid and vapor components separate from centrifugal force since the force on the denser liquid is substantially greater than the force acting on the vapor. The separated liquid flows downward due to gravity into the lower portion of the tower and eventually towards the stripping zone for collection at the bottom of the tower. The vapor component also flows downwardly and then out of the horn into the lower pressure flash zone and is swept upwardly through the hollow central core of the tower towards the wash zone.

One example of a peripheral horn is shown in U.S. Pat. No. 4,770,747 which, in this case, has angularly disposed vanes connected between the walls of the channel so that vapor-liquid separation takes place evenly along the arc length of the horn. Another example is shown in U.S. Pat. No. 4,315,815 in which corrugated vanes are disposed in the horn for utilizing the centrifugal motion to create turbulence in the stream in the inlet horn. In this case, the turbulence causes a portion of the fine particle size bituminous material to impinge on the surfaces of the inlet horn and recombine with the fluid so that vaporized solvent and steam can be withdrawn.

U.S. Pat. No. 5,516,465 and U.S. Pat. No. 5,605,654 describe feed horns which are intended to increase the horizontal distribution of the vapor so that enhanced vapor/liquid interaction in the tower above the feed zone is achieved. One form of vapor distributor comprises an annular wall which is spaced inwardly from the shell of the tower to form a feed channel and which is built up from a number of circumferential segments which are radially staggered to form outlet ports along the circumference of the wall. Each outlet allows a portion of the vapor stream flowing through the distributor to leave the channel and flow into the central core of the tower.

Another form of feed horn is shown in U.S. Pat. No. 6,889,961; this uses guide vanes in the annular channel which extend across the channel and upwards through its open bottom to direct the mixed phase feed in a downward direction into the open core of the tower. The vanes are positioned at gradually increasing heights in the direction of stream flow in the channel so that they progressively pare off a portion of the total liquid/vapor flow in the channel and direct it into the lower portion of the tower.

The problem with the known feed horn devices is that they still allow an amount of vapor with entrained liquid to move up through the core of the tower into the upper wash zone. In a typical tower, it will be found that the overflash, which includes vacuum gas oils from the wash oil, which will be collected in the overflash collection tray, typically has a high percentage of resid and is not suitable for certain feed applications, especially for fluid catalytic cracking (FCC). In order to use the overflash more effectively, especially for FCC feed, it is desirable to reduce the entrainment of resid further. Additionally, more effective de-entrainment will improve the reliability of the wash zone. Excessive resid entrainment in the wash zone accelerates formation of coke, forcing sub optimal operation and premature shutdown. Higher quality overflash, such as would be acceptable for FCC, can increase wash oil rates and virtually eliminate the risk of coking, allowing units to operate at higher temperatures and higher efficiencies.

Experience and testing has shown that the conventional types of feed horn such as those described in the patents noted above inherently direct vapor into the zone below the inlet device, increasing the flow strength or creating localized interference with liquid collected on the wall of the flash zone above the stripping section. Thus, there is a need for a separation device in which entrainment of liquid resid by the vapor flow can be significantly reduced.

SUMMARY OF THE INVENTION

The present invention enables a reduction in the re-entrainment of liquid in a mixed phase feed stream in heavy oil fractionators to be achieved by utilizing a tangential feed inlet that is more effective in separating the liquid from the vapor phase by reducing the rotational velocity of the vapors in the core of the tower below the level of the feed device, e.g. the annular feed ring. The established constructions, while facilitating the separation by the swirling motion of the feed induced by the feed devices, also tend to re-entrain the liquid due to the high vapor velocity below the annular ring of the feed device. Over time, accumulation of this re-entrained liquid (resid) in the trays or packed internals located above the flash zone can lead to fouling and coking problems and limit the unit run length, as noted above.

The present invention provides a feed device for use in a distillation tower, primarily in an atmospheric or vacuum tower, which effectively reduces the re-entrainment of coalesced liquid that often occurs due to the high vapor velocity in the flash zone below the feed device. It achieves this end by adding vapor scoop(s) or other vapor outlets to a feed horn with one or more tangential feed inlets which separate the flow of a substantial proportion of the vapor from the liquid and direct it through an exit port towards the central core of the tower, desirably without any downwardly directed vector component, although an upward vector is permissible and may be found desirable. The objective is to remove at least some of the high velocity liquid-free vapor from the channel and to direct it horizontally into the core of the tower. The configuration of the feed device takes advantage of cyclonic liquid separation which takes place in the feed channel, concentrating the vapor flow at the inner wall of the inlet device. Discharging some of the liquid-free vapor towards the inner core in this manner helps to reduce the velocity in and below the annular ring or horn and also reduces the axial velocity of the vapor once it turns upward. To this end, the scoops are preferably disposed around the feed channel so that only dry vapor (free of entrained liquid) is discharged horizontally and possibly upwards in the tower.

According to the present invention, therefore, a feed device for a distillation tower or column comprises a generally segmental or annular, open bottom channel located around the periphery of the feed zone of the of the tower; the channel has an inner wall spaced from the inner curved wall of the tower and a top covering the channel to confer a generally inverted-U shape to the cross section of the channel. One or more tangential feed inlets, which have the same rotational orientation, are provided to admit the heated, mixed phase feed to the tower, directing the feed into and along the channel. One or more vapor scoops are provided for each feed inlet with the scoop(s) located on the inner wall of the channel, each at a sufficient distance along the channel from the inlet to permit the initial inertial, cyclonic separation of vapor and liquid to take place before the vapor in the feed from the inlet enters the scoop(s) and passes through a vapor exit port into the central core of the tower.

The feed device is primarily useful in the vacuum towers and atmospheric distillation towers used for the fractionation of petroleum oils but may also be used in other distillation towers or columns used for other types of fractionation with mixed phase feeds.

The distillation tower when in the form of a petroleum vacuum tower, is located upright with a vertical axis and has a lower stripping zone, upper zone which may be referred to as a wash, contact or rectification zone, and a flash zone between the stripping zone and the wash zone. An inlet for the feed to be distilled is located between the stripping zone and the wash zone, usually within and towards the top of the flash zone and comprises an annular feed channel around the central open core of the flash zone in the tower. An inlet for a stripping medium, usually steam, is located in the lower part of the stripping zone so that the stripping medium passes up through the stripping zone to remove the more volatile components from the high boiling residual material which enters the stripping zone from the flash zone above it.

In operation, the heated, mixed phase liquid/vapor feed is admitted through the tangential inlet or inlets and directed from the inlet(s) into the channel. A cyclonic separation of vapor in the feed from the liquid is effected as the feed passes from the inlet and along the circular path defined by the channel; after a sufficient passage along the channel to enable the separation between the liquid and vapor components of the feed to be substantially established, the vapor is separated from the liquid by means of centrifugal action in the channel and directed into a vapor scoop from which it passes through a vapor exit port into the central core of the tower with a radial component of velocity.

The feed channel is usually an annular channel extending all the way around the periphery of the flash zone and it can be divided by internal partitions into two or more segments, each with its own inlet and vapor scoop(s). Alternatively, two or more segmental channels may be provided each with its own feed inlet and scoop(s) with the two segments aligned so as to approximate to an annular channel. In either event, the same considerations relating to the treatment of the feed and its separation in the channel(s) apply.

The present feed device is particularly favorable when used in combination with a radial louvre baffle at the top of the stripping zone of the tower, as described in U.S. Pat. No. 7,981,253. This preferred configuration uses a non-rotating, radially-louvered liquid de-entrainment baffle at the top of the stripper zone and below the flash zone. The baffle has a central axis corresponding to the vertical axis of the tower with a plurality of radial fins with openings between them to permit the upward passage of vapors from the stripper zone below the baffle; each fin is angularly inclined with respect to a plane passing through the longitudinal axis of the tower in such a manner that the upper edge of each fin is displaced relative to the lower edge in the direction of rotational movement of the rotating vector of the incoming vapor and liquid feed so that the fins do not obstruct the rotation of the vapor and liquid mixture, causing splashing or turbulent droplet breakup.

DETAILED DESCRIPTION

The present feed devices can be used in various distillation towers, particularly in atmospheric and vacuum towers used for processing petroleum streams. While the device is described in the context of a vacuum tower in a petroleum refinery, it may also be used in other hydrocarbon and non-hydrocarbon systems in which feed streams are flashed to produce mixed phase feeds where it is desirable to reduce liquid entrainment.

Figure 1:
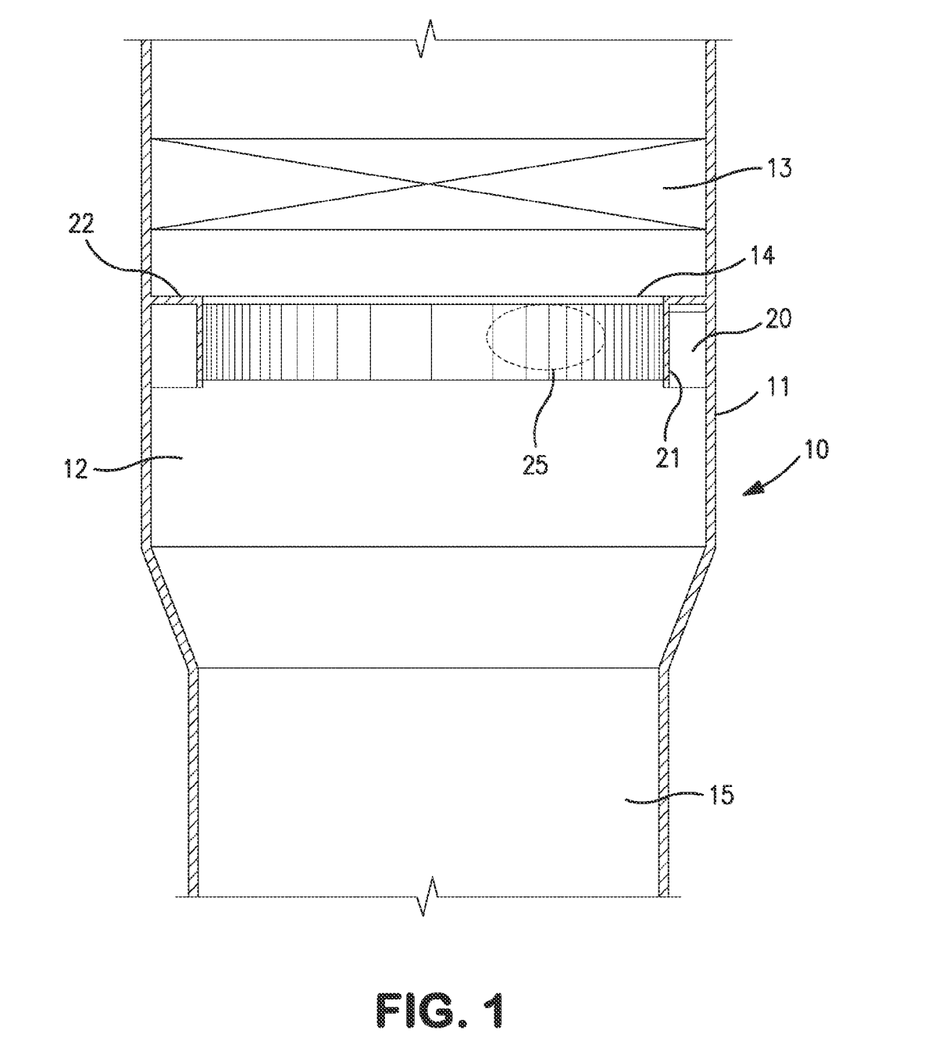
FIG. 1 is a vertical cross-section through a vacuum tower useful for petroleum vacuum distillation incorporating a feed device with vapor scoops.

The components representative of a vacuum distillation tower 10 shown in FIG. 1 can be used for fractionating an atmospheric resid derived from a petroleum crude or reduced crude. The tower 10 is formed of an upright shell 11 with a circular cross-section in plan view (not shown) in the conventional manner with its axis vertical. Thus, the inner peripheral wall of the tower is arcuately curved. The tower has a flash zone 12 located beneath a wash or contact zone 13 with a feed device or feed horn 14 located in this zone. Below the flash zone, the diameter of the tower decreases to define a lower portion 15 housing the stripping zone (not shown). The wash zone may conventionally include structured packing, random packing, grid packing and spray zone to remove residual components from the ascending vapor stream. Wash oil is delivered to this zone by conventional arrangements of conduits, valves and headers. The lighter fractions are removed at the top of the wash zone in the conventional manner. Similarly the stripping zone will be equipped with stripper trays over which the descending heavy fractions pass to have any remaining lighter fractions vaporized and removed by means of steam introduced at the bottom of the tower in the normal way with the resid fraction being conducted away from the bottom of the tower.

Figure 2:
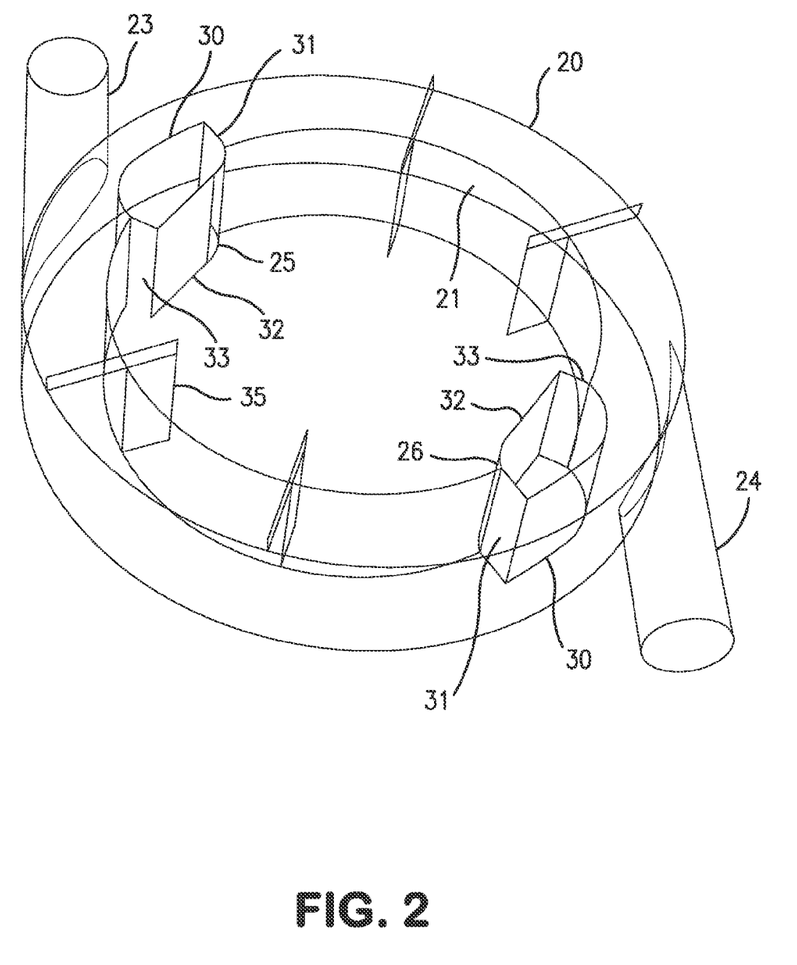
FIG. 2 is a bottom view, simplified, isometric schematic of a feed device incorporating vapor scoops.
Figure 3:
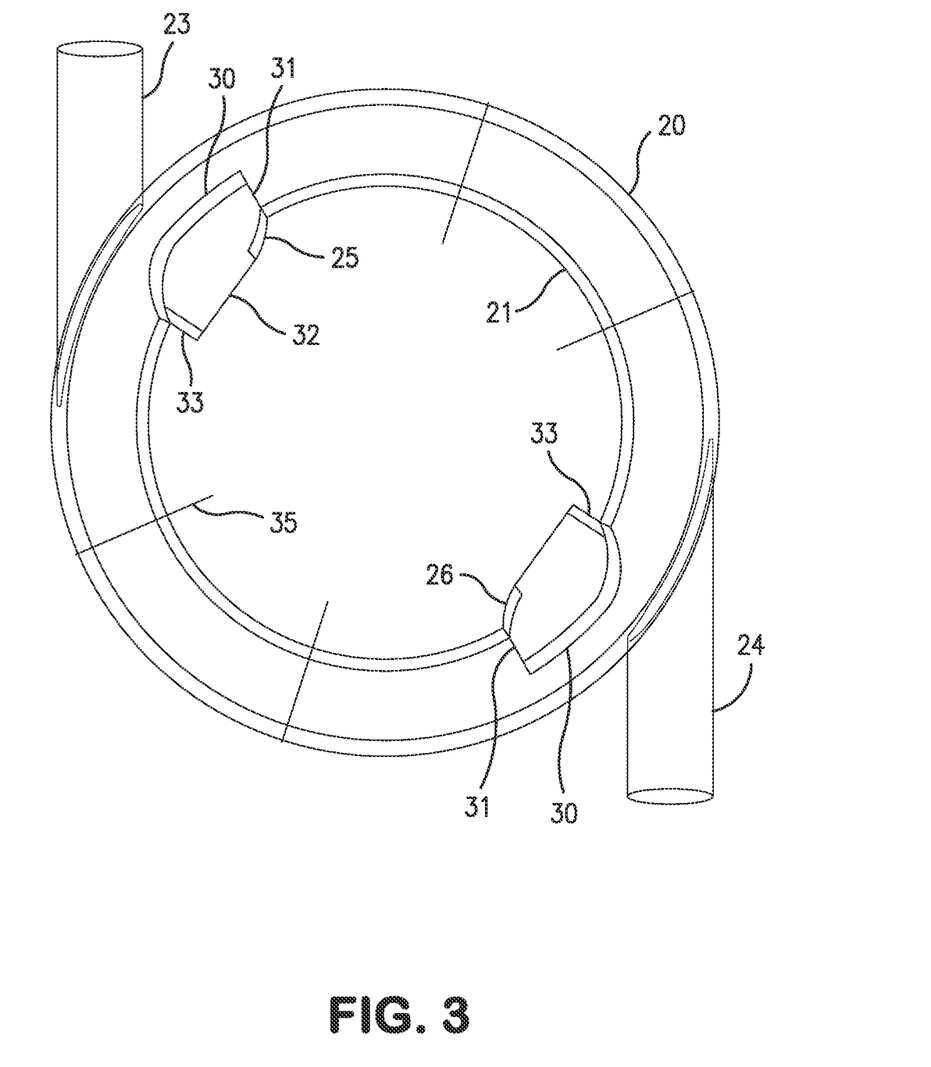
FIG. 3 is a top view of the feed device of FIG. 2.
Figure 4:
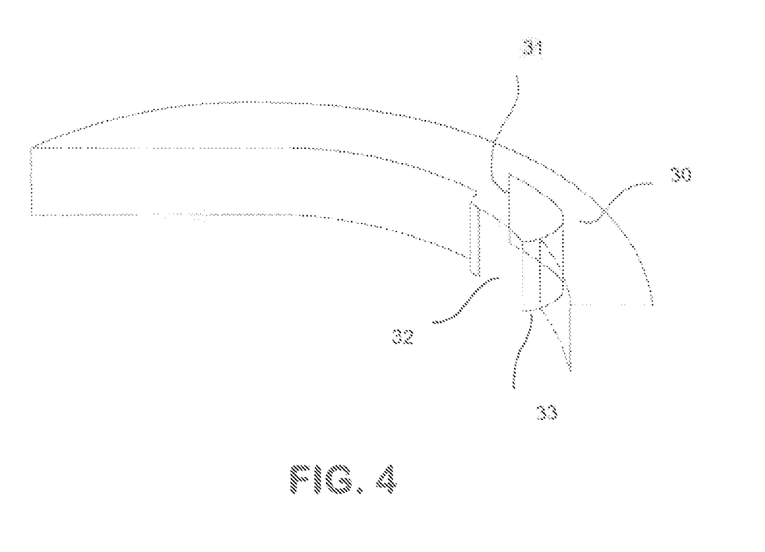
FIG. 4 is a side view, isometric schematic of the feed device incorporating the vapor scoop.

The feed device 14 is in the form of an annular, open-bottomed, inverted U-shaped channel with an outer wall formed by the curved inner face of the tower shell. An inner wall 21 is spaced from the outer wall 20 with the spacing distance set by the tower characteristics, especially feed rate for the design feed. The closed top of the channel is formed by an annular top wall 22 extending between the outer and inner walls of the channel. The feed device is fitted with two tangential feed inlets 23, 24 located at opposite ends of a diameter of the channel as shown in FIGS. 2 and 3.

The channel has two vapor scoops 25, 26 (one scoop 25 indicated in feint in FIG. 1), located along the direction of flow of the feed from the inlets at a remove sufficient to allow the rotational flow of the feed along the channel from the respective inlets to effect an inertial, cyclonic separation of the two phases in the feed. In this case, the scoops are located diametrically opposite one another at the same angular separation from their respective feed inlets. As the mixed phase feed passes along the channel from the inlets, the greater density of the liquid phase will cause it to pass along the outer wall of the channel while the vapor will be displaced by the denser liquid to pass along the inner wall 21. The top wall 22 constrains the feed stream from upward flow while it is in the channel while the open bottom of the channel permits the liquid to fall down into the lower levels of the tower.

The vapor scoops have a specific form and location which is adapted to separate the vapor flow from the stream in the channel and to direct the vapor from the channel out towards the central axis of the tower and into the open central core without imparting any substantial downward vector to the emerging vapors. The objective is to maintain cyclonic separation of vapor and liquid by reducing the rotational velocity below the level of the feed device and to secure a substantially non-rotational, axial flow of ascending vapor in this zone. In this way, the entrainment is significantly reduced. In this respect, the present feed device functions in a manner which marks it apart from the conventional devices such as those mentioned above which inherently direct vapor below the device, increasing the strength of the flow field or creating localized interference with liquid collected on the wall of the tower below the feed ring.

The locations of the inward projecting scoops are set to ensure that the inherent cyclonic separation achieved in the tangential inlet device is not lost. The location of the scoops is set to ensure that separated and liquid-free vapor is directed into the upward flowing vapor field. The scoops have the purpose to move the redirected vapor away from the cyclonic activity (rapidly swirling vapor) below the feed device. By reducing the strength of the cyclone below the device the level of previously captured liquid which is carried upwards in the tower as the vapor moves upward is significantly reduced.

To direct the vapor flow as desired, the scoops are formed with a vapor/liquid separator member 30 (FIGS. 2 and 3) which has a vertical leading edge 31 facing the feed stream in the channel and spaced at a distance between the inner and outer walls of the channel so that will separate the vapor and liquid components of the design feed under design operating conditions, e.g. of temperature, pressure. While the separation will tend to be optimal only with the design feed or other feeds of similar distillation characteristics, the action of the scoops will provide an improvement in overall vapor/liquid separation and reduction of resid entrainment even with other feeds. From the leading edge, parallel to the inner and outer faces of the channel, the vapor/liquid separator 30 extends along more or less parallel to the inner and outer faces of the channel for a distance before curving outwards to the outlet port 32 in the inner face of the channel. To ensure direction of the vapor flow towards the central axis of the tower, the member has an extension 33 which protrudes a short distance out into the open central core of the tower. This extension ensures that the forward component of velocity possessed by the vapor stream as it enters the scoop is redirected radially inwards towards the core to reduce the circumferential component which would tend to increase the cyclonic action below the level of the feed device. It is, however, conceived that an upward vector may be imparted to the vapor exiting the scoop by a guide vane located along the lower edge of the outlet port.

Each tangential inlet tract is given at least one scoop so that if a single tangential inlet is used, there may be one or two scoops in the channel and if there're are two inlets, there will be at least two scoops, each located along the channel from its respective inlet to permit the cyclonic vapor/liquid separation to take place before the stream encounters the leading edge of the scoop. It is possible to provide more than one scoop for each inlet provided, of course, that the length of the channel between the inlet and the first scoop which the feed stream from that inlet encounters is sufficient to effect the required separation to ensure that the vapor stream exiting the scoop contains no substantial proportion of liquid. As noted above, the feed device may comprise of a single completely annular ring or two or more segmental channels, each with its own tangential feed inlet and associated vapor scoop(s).

In operation, the heated mixed phase feed formed of vapor and liquid enters the tower 10 through the tangential inlets 23, 24. The feed experiences centrifugal action in the annular ring channel to effect a separation of much of the liquid from the vapor. The separated liquid then moves down the tower 10 by gravity and is collected and stripped of volatile components in the bottom, or stripping section.

To further the desired flow characteristics, anti-swirl baffles are provided in the form shown in FIGS. 2 and 3, indicated (one only) at 35. The baffles comprise vertical plates which extend out from the inner wall of the channel into the open central core of the tower to promote the desired axial flow pattern in this region of the tower. The baffles may extend under the open bottom of the channel as shown in FIG. 2 and be fastened to the inner wall of the tower for additional rigidity. Alternative forms of anti-swirl baffles may be used, for example, those shown in U.S. 2008/0314729, to which reference is made for a description of the various forms of anti-swirl baffle which may be used in a vacuum tower to maintain an appropriate flow pattern. The perforated baffles are particularly preferred.

Figure 5:
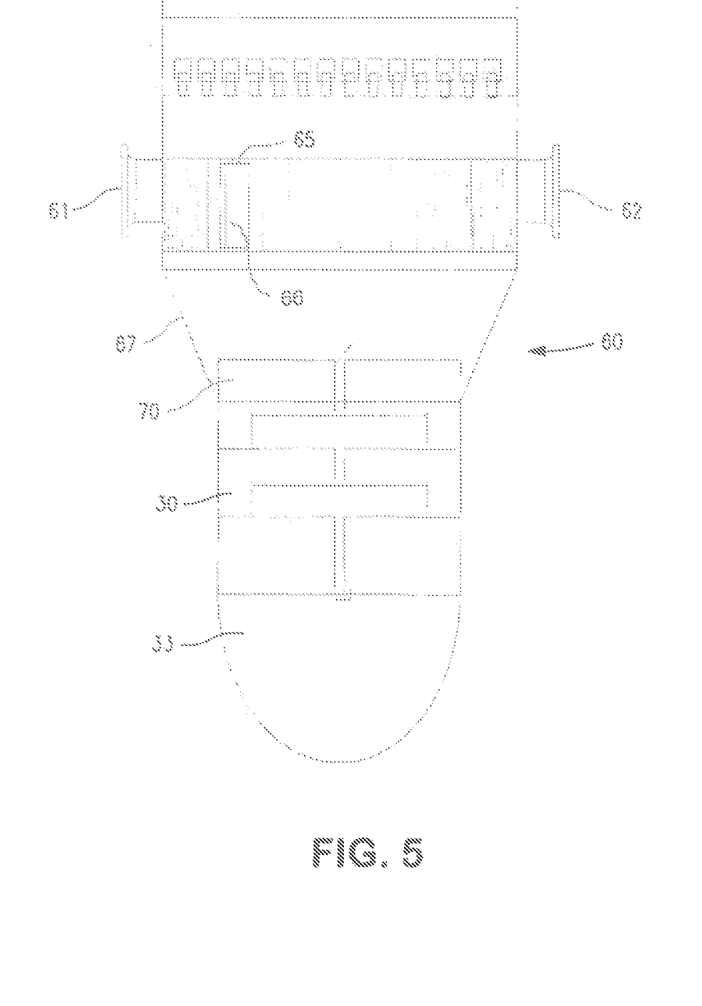
FIG. 5 is a vertical cross section through a vacuum tower useful for petroleum vacuum distillation incorporating a feed device with vapor scoops and a radial louvre baffle at the top of the stripper section.

The feed devices are favored for use in combination with the radial louvre baffles above the stripping zone as described in U.S. Pat. No. 7,981,253 to which reference is made for a description of the radial louvre baffle and its use in distillation towers, especially vacuum towers. FIG. 5 shows the radial louvre baffle at the top of the stripper section as described in U.S. Pat. No. 7,981,253 in combination with the present feed device in a typical vacuum tower configuration. The radial louvre baffle is located in vacuum tower 60, with only the lower portion of the tower illustrated for simplicity. The feed enters tower 60 through two tangential inlets 61, 62 which feed into two feed horns in the form of an inverted segmental channel as described above. A single inlet or multiple inlets may be provided if design considerations so indicate. The configuration of the inlet horns confers a rotating vector of motion to the incoming liquid feed as it enters the lower portion of the tower below the feed inlet device so that its path can be considered as a downward helix while the majority of the vapors exits through the vapor outlet ports in the side of the channel facing the central core of the tower, one visible at 65 into the central core of the tower. The outlet ports are preferably each provided with an extension 66 similar to extensions 33 to promote radially inward gas flow into the central core of the tower. The liquid component of the feed enters the flash zone below the feed inlet device of the tower with a rotating vector of motion imparted by the inlet system. The feed maintains its characteristic rotating flow pattern within the flash zone of the tower and mixes with the vapor stream ascending from the striper zone in the flash zone. Liquid droplets from the feed which have exited the feed horns through the open bottom of the channel are spun outwards by the rotating motion acquired in the channel and collect on the walls of the flash zone. These droplets then coalesce and pass downwards to a circular channel formed between the walls 67 of the flash zone and an outer peripheral collar of the radial louvre baffle 70 located on the top of the stripper zone. In detail, the baffle is shown in U.S. Pat. No. 7,981,253 with special reference to FIGS. 2 to 8 to which reference is made for a description of the baffle and its features. The liquid passes down through a downcomer in the baffle, formed, for example, by a gap or gaps in the outer collar of the baffle onto the top stripper tray in the stripping zone and then onto the next tray and successively to any additional stripper trays.

An inlet for the steam stripping medium is provided in the reboil section 33 at the bottom of the tower. Alternative pathways for the liquid into the stripper zone 30 may be provided, for example, by conduits formed externally of the tower 20 or by having a higher peripheral collar to the baffle with a number of ports below the level of the fins through which the liquid may pass from a channel at the edge of the baffle (see FIGS. 2-6 of U.S. Pat. No. 7,981,253) and into the stripper zone. Vapors coming up from the region below the radial louvre baffle join with the vapors flashed from the incoming feed and move into the wash zone of the tower.

Figure 6:
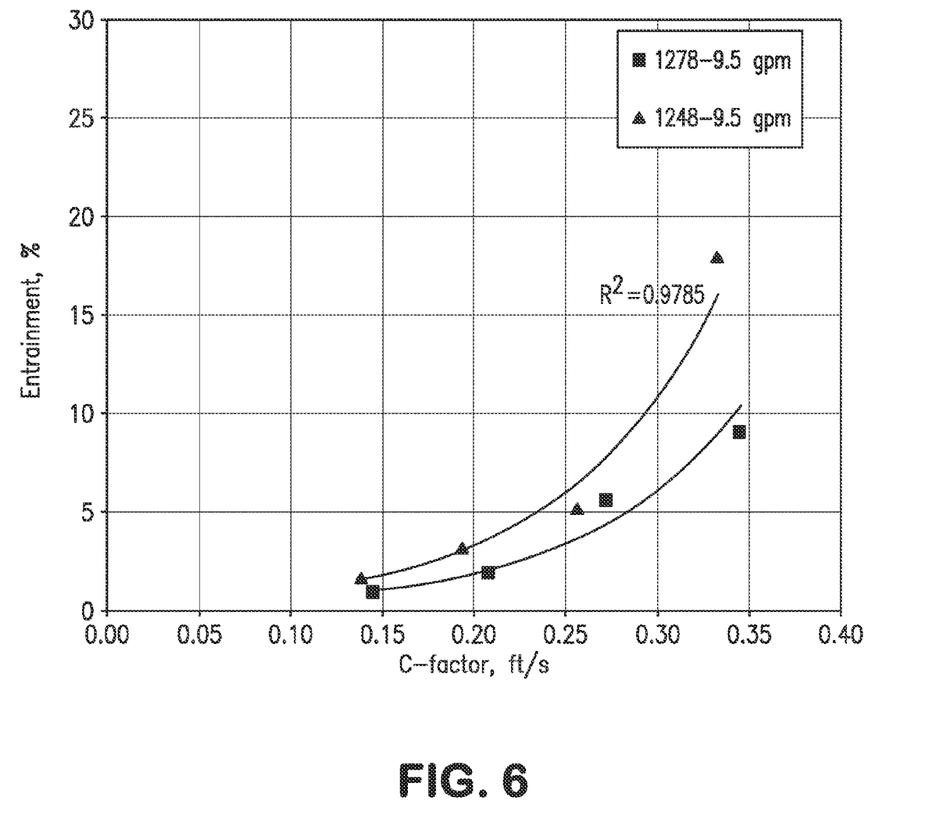
FIGS. 6 and 7 are graphs showing the reduced degree of liquid entrainment achieved with the feed devices incorporating vapor scoops.
Figure 7:
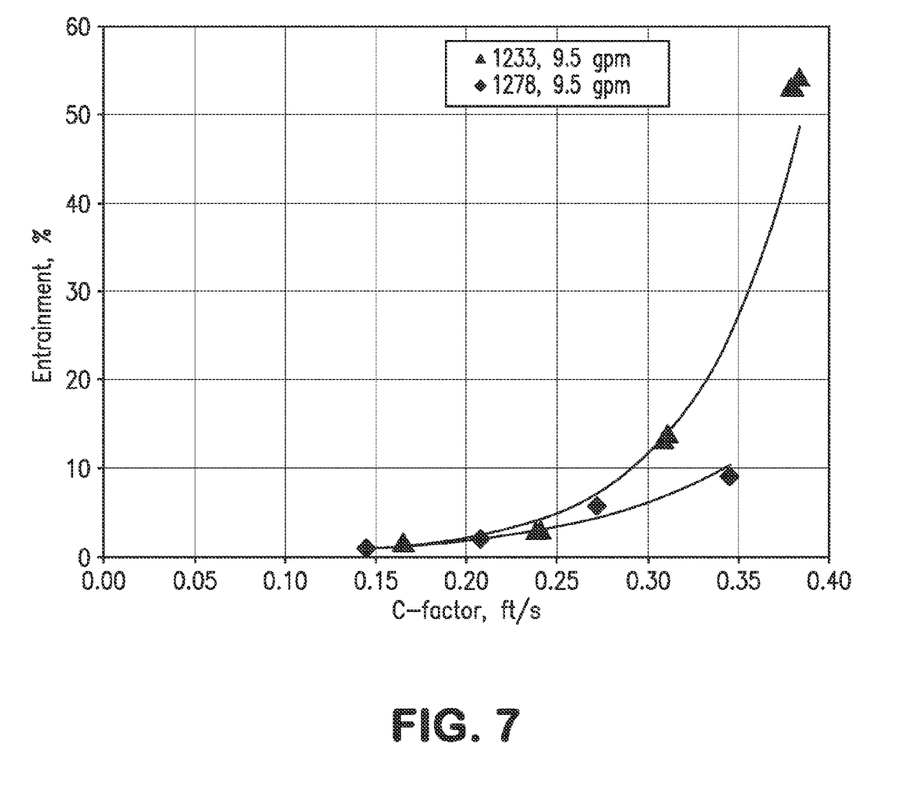

The reduction in entrainment achieved by the use of the present feed inlet device is shown in FIGS. 6 and 7. In FIG. 6, the upper line designated "1248" represents the degree of entrainment at a flow rate of 36 l/min. (9.5 US gallons/min.) in a cold flow study utilizing air and water system with a conventional feed inlet device with dual tangential inlets and otherwise of similar construction but lacking the vapor/liquid separator scoops. The lower line "1278" shows the lesser degree of entrainment achieved when the scoops are added to direct the separated vapor into the central core of the tower at the same flow rate. FIG. 7 shows the difference in entrainment achieved in a cold flow study when using the feed device of the present invention (lower line "1278") as compared to that with a conventional feed inlet device as shown in U.S. Pat. No. 6,889,962, both at the same rate of flow at 36 l/min (upper line "1233").

The invention claimed is:

1. A feed device for a distillation tower which comprises:
  an open bottom channel located around the periphery of a feed zone and a hollow central core of the of the tower, the channel having a curved inner wall spaced from an inner curved wall of the tower and a top covering the channel;
  at least one tangential feed inlet to admit heated, mixed phase feed to direct the feed into and along the channel;
  at least one vapor scoop for each feed inlet located on the inner wall of the channel, each at a sufficient distance along the channel from the inlet to permit cyclonic separation of vapor and liquid to take place before the vapor in the feed from the inlet enters the scoop, the scoop having a vapor exit port in the inner wall of the channel to permit vapor to pass into the central core of the tower, said vapor exit port having a proximal edge and a distal edge relative to the direction of flow of the feed; wherein the scoop further comprises a substantially vertical leading edge facing the direction of flow of feed from the tangential feed inlet, said leading edge being spaced a distance between the inner wall of the channel and inner wall of the tower; wherein from the leading edge, the scoop extends substantially parallel to the inner wall of the channel and inner wall of the tower for a distance before curving to meet the distal edge of the vapor exit port.

2. A feed device according to claim 1 in which the channel comprises an annular channel with two diametrically opposed tangential feed inlets with at least one vapor scoop for each inlet.

3. A feed device according to claim 1 in which the vapor scoop imparts no substantial downward component of velocity to the vapor passing through the scoop into the central core of the tower.

4. A feed device according to claim 1 in which the vapor scoop directs the vapor passing through the scoop radially inwards into the central core of the tower.

5. A feed device according to claim 1 in which the vapor scoop comprises an extension which protrudes into the open central core of the tower to redirect the vapor stream radially inwards towards the central core of the tower.

6. A distillation tower having a vertical central axis and a hollow central core with a flash zone, a wash zone above the flash zone and a stripper zone below the flash zone, the flash zone having a feed inlet device comprising:

an open bottom channel located around the periphery of the flash zone and the hollow central core of the of the tower, the channel having a curved inner wall spaced from an inner curved wall of the tower and a top covering the channel with at least one tangential feed inlet to admit heated, mixed phase feed into and along the channel, at least one tangential feed inlet to admit heated, mixed phase feed into and along the channel;

at least one vapor scoop for each feed inlet located on the inner wall of the channel, each at a sufficient distance along the channel from the inlet to permit cyclonic separation of vapor and liquid to take place before the vapor in the feed from the inlet enters the scoop, the scoop having a vapor exit port in the inner wall of the channel to permit vapor to pass into the central core of the tower, said vapor exit port having a proximal edge and a distal edge relative to the direction of flow of the feed; wherein the scoop further comprises a substantially vertical leading edge facing the direction of flow of feed from the tangential feed inlet, said leading edge being spaced a distance between the inner wall of the channel and inner wall of the tower; wherein from the leading edge, the scoop extends substantially parallel to the inner wall of the channel and inner wall of the tower for a distance before curving to meet the distal edge of the vapor exit port.

7. A distillation tower according to claim 6 in which the channel comprises an annular channel with two diametrically opposed tangential feed inlets with at least one vapor scoop for each inlet.

8. A distillation tower according to claim 6 in which the vapor scoop imparts no substantial downward component of velocity to the vapor passing through the scoop into the central core of the tower.

9. A distillation tower according to claim 6 in which the vapor scoop directs the vapor passing through the scoop radially inwards into the central core of the tower.

10. A distillation tower according to claim 6 in which the vapor scoop comprises an extension which protrudes into the open central core of the tower to redirect the vapor stream radially inwards towards the central core of the tower.

11. A distillation tower according to claim 10 in which the extension of the vapor scoop protrudes into the open central core of the tower from the open end of the exit port remote from the feed inlet.

12. A distillation tower according to claim 6 which comprises anti-swirl baffles mounted on the inner wall of the channel extending into the hollow central core of the tower.

13. A distillation tower according to claim 12 in which the baffles are perforated baffles.

14. A distillation tower having a vertical central axis and a hollow central core with a flash zone, a wash zone above the flash zone and a stripper zone below the flash zone with a non-rotating, radially louvered baffle at the top of the stripper zone and below the flash zone, the flash zone having a feed inlet device comprising:

an open bottom channel located around the periphery of the flash zone and the hollow central core of the of the tower, the channel having a curved inner wall spaced from an inner curved wall of the tower and a top covering the channel with at least one tangential feed inlet to admit heated, mixed phase teed into and along the channel, at least one tangential feed inlet to admit heated, mixed phase feed into and along the channel;

at least one vapor scoop for each feed inlet located on the inner wall of the channel, each at a sufficient distance along the channel from the inlet to permit cyclonic separation of vapor and liquid to take place before the vapor in the feed from the inlet enters the scoop, the scoop having a vapor exit port in the inner wall of the channel to permit vapor to pass into the central core of the tower; said vapor exit port having a proximal edge and distal edge relative to the direction of flow of the feed; wherein the scoop further comprises a substantially vertical leading edge facing the direction of flow of feed from the tangential feed inlet, said leading edge being spaced a distance between the inner wall of the channel and inner wall of the tower; wherein from the leading edge, the scoop extends substantially parallel to the inner wall of the channel and inner wall of the tower for a distance before curving to meet the distal edge of the vapor exit port;

the non-rotating, radially-louvered liquid de-entrainment baffle having a central axis corresponding to the vertical axis of the tower, and comprising a plurality of radial fins with openings between the fins to permit the upward passage of vapors from the portion of the tower below the baffle located below the flash zone and above the stripping zone, each fin being angularly inclined with respect to a plane passing through the central axis of the tower in such a manner that the upper edge of each fin is displaced relative to the lower edge in the direction of rotational movement of the rotating vector of the incoming feed to impart a rotation to the vapors ascending from the stripper zone in the same rotational sense as the rotation of the liquid feed entering the flash zone from the channel.

15. A distillation tower according to claim 14 in which the channel comprises an annular channel with two diametrically opposed tangential fed inlets with at least one vapor scoop for each inlet.

16. A distillation tower according to claim 14 in which the vapor scoop comprises an extension which protrudes into the open central core of the tower from the open end of the exit port remote front the feed inlet to redirect the vapor stream radially inwards towards the central core of the tower.

17. A method of separating the vapor and liquid in a mixed phase stream entering a an upright, vertical central axis and a hollow central core with a flash zone, a wash zone above the flash zone and a stripper zone below the flash zone, the flash zone having a feed inlet device comprising an open bottom channel located around the periphery of the flash zone and the hollow central core of the of the tower, the channel having a curved inner wall spaced from an inner curved wall of the tower and a top covering the channel with at least one tangential feed inlet to admit heated, mixed phase feed into and along the channel, which method comprises:

admitting feed through the tangential inlet and directing the fed from the inlet into the channel;

effecting cyclonic separation of vapor in the mixed phase feed from liquid in the feed as the feed passes from the inlet along the channel, separating vapor from liquid by means of a vapor/liquid separator located in the channel at a distance along the channel from the inlet;

directing separated vapor into a vapor scoop to pass into the central core of the tower with a radial velocity vector, said vapor scoop at a sufficient distance along the channel from the inlet to permit cyclonic separation of vapor and liquid to take place before the vapor in the feed from the inlet enters the scoop, the scoop having a vapor exit port in the inner wall of the channel to permit vapor to pass into the central core of the tower, said vapor exit port having a proximal edge and a distal edge relative to the direction of flow of the feed; wherein the scoop further comprises a substantially vertical leading edge facing the direction of flow of feed from the tangential feed inlet, said leading edge being spaced a distance between the inner wall of the channel and inner wall of the tower; wherein from the leading edge, the scoop extends substantially parallel to the inner wall of the channel and inner wall of the tower for a distance before curving to meet the distal edge of the vapor exit port.

18. A method according to claim 17 in which the vapor scoop imparts no substantial downward component of velocity to the vapor passing through the scoop into the central core of the tower.

19. A method according to claim 18 in which the vapor scoop directs the separated vapor radially into the central core of the tower.

* * * * *